(12) United States Patent
Minakuchi (10) Patent No.: US 11,556,101 B2
(45) Date of Patent: Jan. 17, 2023

(54) APPLIANCE MANAGEMENT SYSTEM (71) Applicant: TOSHIBA TEC KABUSHIKI KAISHA, Tokyo (JP)

(72) Inventor: Hiroshi Minakuchi, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 663 days.

(21) Appl. No.: 16/566,525

(22) Filed: Sep. 10, 2019

(65) Prior Publication Data

US 2021/0072712 A1   Mar. 11, 2021

(51) Int. Cl.
| | |
|---|---|
| *G05B 19/042* | (2006.01) |
| *H04W 4/80* | (2018.01) |
| *H04W 76/10* | (2018.01) |
| *G01M 99/00* | (2011.01) |
| *H04L 67/12* | (2022.01) |
| *H04W 4/06* | (2009.01) |

(Continued)

(52) U.S. Cl.
CPC ......... *G05B 19/042* (2013.01); *G01M 99/005* (2013.01); *H04L 67/12* (2013.01); *H04W 4/06* (2013.01); *H04W 4/80* (2018.02); *H04W 76/10* (2018.02); *G05B 2219/23238* (2013.01); *H04L 12/40* (2013.01); *H04W 84/12* (2013.01)

(58) Field of Classification Search
CPC ....... G05B 19/042; G05B 2219/23238; H04W 4/80; H04W 76/10; H04W 4/06; H04W 84/12; G01M 99/005; H04L 67/12; H04L 12/40
See application file for complete search history.

(56) References Cited

U.S. PATENT DOCUMENTS

| | | |
|---|---|---|
| 9,426,321 B2 | 8/2016 | Sumita et al. |
| 9,952,817 B2 | 4/2018 | Kanakubo |

(Continued)

FOREIGN PATENT DOCUMENTS

| | | |
|---|---|---|
| EP | 3115882 A1 | 1/2017 |
| EP | 3393148 A1 | 10/2018 |

OTHER PUBLICATIONS

Extended European Search Report dated Nov. 30, 2020, mailed in counterpart European Patent Application No. 20179669.5, 9 pages.

*Primary Examiner* — Normin Abedin
(74) *Attorney, Agent, or Firm* — Kim & Stewart LLP (57) ABSTRACT

An appliance management system includes a plurality of appliances connected to a network and a portable terminal. Each of the appliances includes a sensor configured to detect an abnormality of the appliance, and a first near field wireless communication module configured to broadcast an identifier of the appliance when the sensor detects the abnormality. The portable terminal includes a second near field wireless communication module and a controller. The controller is configured to control the second near field wireless communication module to transmit an access request to an abnormal appliance upon the second near field wireless communication module receiving an identifier of the abnormal appliance. The terminal controller is also configured to control a display to display an abnormality screen including the identifier of the abnormal appliance upon the second near field wireless communication module receiving abnormality information from the abnormal appliance.

20 Claims, 6 Drawing Sheets

(51) Int. Cl.
*H04L 12/40* (2006.01)
*H04W 84/12* (2009.01)

(56) References Cited

U.S. PATENT DOCUMENTS

| | | | |
|---|---|---|---|
| 2006/0259183 A1* | 11/2006 | Hayes | H04L 12/2805 |
| | | | 700/221 |
| 2007/0118638 A1* | 5/2007 | Ban | G05B 23/0272 |
| | | | 709/224 |
| 2016/0241728 A1* | 8/2016 | Naruse | G06F 3/1207 |
| 2017/0013153 A1 | 1/2017 | Shin et al. | |
| 2019/0287050 A1* | 9/2019 | Gillen | G06Q 10/1093 |

* cited by examiner

APPLIANCE MANAGEMENT SYSTEM

FIELD

Embodiments described herein relate generally to an appliance management apparatus.

BACKGROUND

Various equipment and appliances can be installed on manufacturing lines in manufacturing facilities and on distribution lines in distribution facilities. The equipment and appliances can be provided with an operation panel for displaying various kinds of information and receiving inputting operations. These devices are preferably arranged so as to perform various processes efficiently. However, there is a case in which the operation panel is oriented for operational efficiency is oriented in a direction in which it can be difficult for a maintenance person to perform a maintenance operation.

An operation panel capable of being attached to and detached from a main device body is known. Through such an operation panel, a particular device can be selected and operated.

However, if such an operation panel can be connected to a plurality of devices by wireless communication, it may be difficult to know which one of the several devices the operation panel is connected to.

DETAILED DESCRIPTION

According to an embodiment, an appliance management system includes a plurality of appliances connected to a network and a portable terminal connectable to the plurality of appliances. Each of the appliances includes a sensor configured to detect an abnormality of the appliance, and a first near field wireless communication module configured to broadcast an identifier of the appliance when the sensor detects the abnormality. The portable terminal includes a second near field wireless communication module and a terminal controller. The terminal controller is configured to control the second near field wireless communication module to transmit an access request to an abnormal appliance in the plurality of appliances upon the second near field wireless communication module receiving an identifier of the abnormal appliance within a near field wireless communication range. The terminal controller is also configured to control a display to display an abnormality screen including the identifier of the abnormal appliance upon the second near field wireless communication module receiving abnormality information transmitted from the abnormal appliance in response to the access request.

Hereinafter, example embodiments of an appliance management system and apparatus are described with reference to the accompanying drawings. The example embodiments described do not limit the present disclosure. The appliance management system is an application example to an appliance management system set at a facility.

Figure 1:
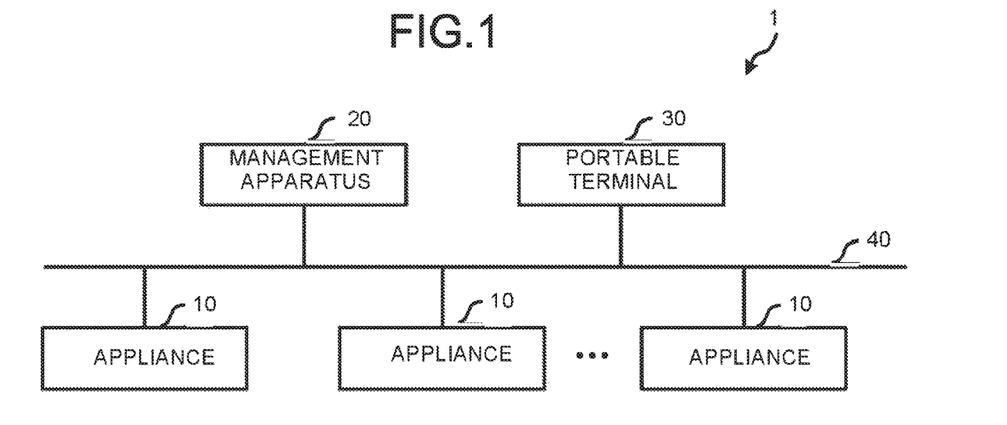
FIG. 1 is a diagram illustrating an example of an appliance management system according to an embodiment.

FIG. 1 is a diagram illustrating an example of an appliance management system 1. The appliance management system 1 is installed at a manufacturing facility or a distribution facility. The appliance management system 1 includes two or more appliances 10, a management apparatus 20, and a portable terminal 30. The appliances 10, the management apparatus 20, and the portable terminal 30 are connected via a network 40 formed by using wireless communication. The communication can be established between an appliance 10 and the portable terminal 30 via the near field wireless communication.

In this example, each appliance 10 is part of a product manufacturing line or a product distribution line. For example, the appliance 10 is a printer, a labeling apparatus, an assembly apparatus for assembling cardboard containers, a packing apparatus for packing an article, or the like. In the present embodiment, an example in which the appliances 10 are an inline printer is described. Each appliance 10 monitors its own state. Then, when an appliance 10 detects an abnormality occurring therein, the appliance 10 notifies the management apparatus 20 of occurrence of the abnormality. Furthermore, the appliance 10 performs near field wireless communication with the portable terminal 30.

The management apparatus 20 manages the appliance 10. For example, the management apparatus 20 is a program logic controller or a server device. The management apparatus 20 receives notification indicating the occurrence of the abnormality from the appliance 10. The management apparatus 20 notifies the portable terminal 30 of the occurrence of the abnormality.

The portable terminal 30 is carried by a maintenance person who maintains the appliance 10. The portable terminal 30 displays the state of the appliance 10. For example, the portable terminal 30 is a smartphone, a tablet terminal, or the like. The portable terminal 30 receives notification indicating that the abnormality occurs in the appliance 10 from the management apparatus 20. The maintenance person goes to an installation location of the appliance 10 in which the abnormality occurs. The portable terminal 30 establishes the near field wireless communication with the appliance 10 when entering a communication enabled area in which the near field wireless communication with the appliance 10 is enabled. The portable terminal 30 performs transmission and reception of various kinds of information via the near field wireless communication. The portable terminal 30 displays the information received from the appliance 10.

Next, hardware structures of various devices of the appliance management system 1 are described.

Figure 2:
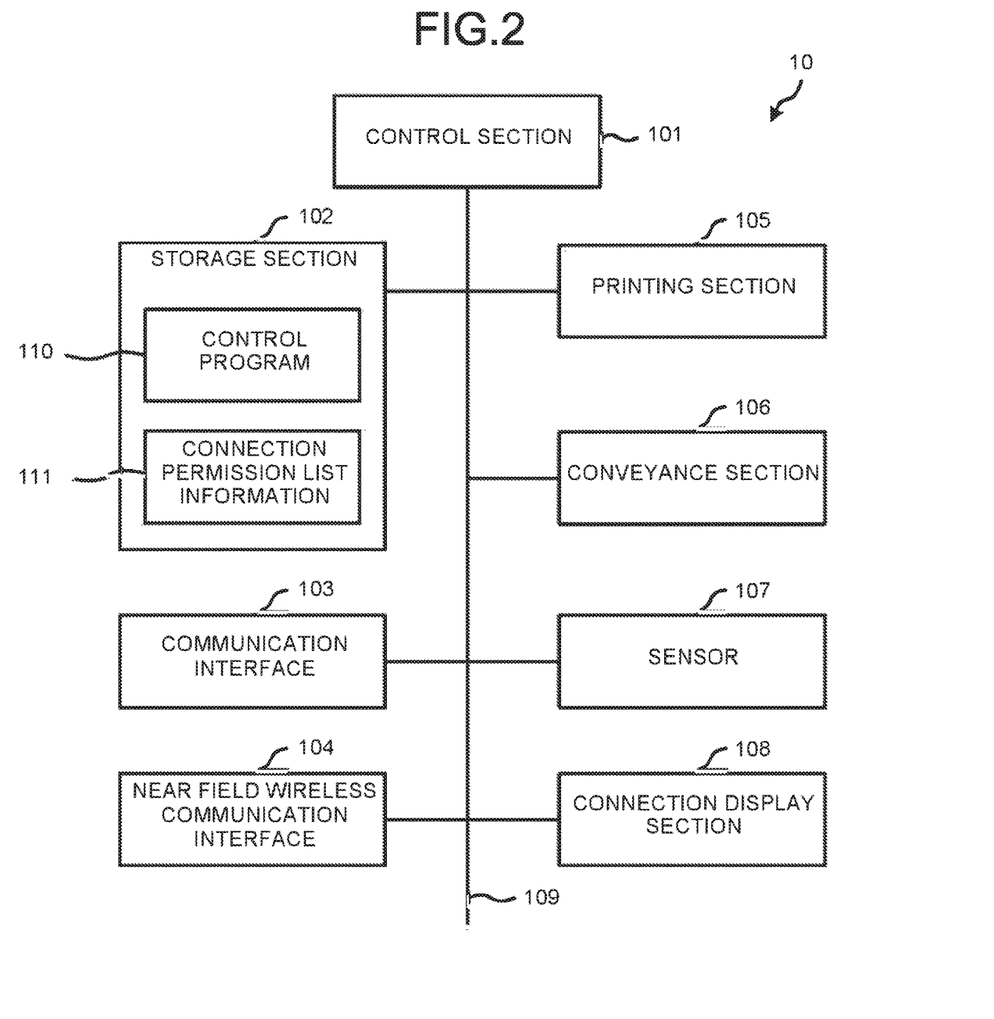
FIG. 2 is a block diagram illustrating an example of a hardware structure of an appliance.

FIG. 2 is a block diagram illustrating an example of the hardware structure of the appliance 10. The appliance 10 includes a control section 101, a storage section 102, a communication interface 103, a near field wireless communication interface 104, a printing section 105, a conveyance section 106, a sensor 107, and a connection display section 108. These sections are mutually connected via a system bus 109 such as a data bus or an address bus.

The control section 101 is a computer that controls the entire operation of the appliance 10 to perform various functions of the appliance 10. The control section 101 includes a CPU (Central Processing Unit), a ROM (Read Only Memory), and a RAM (Random Access Memory). The CPU is a processor that collectively controls the operation of the appliance 10. The ROM is a non-volatile storage medium that holds various kinds of data even when no electric power is supplied. The RAM is a storage medium capable of reading and writing data from and to a designated area. Then, the CPU executes a program stored in the ROM or the storage section 102 on the RAM as a work area (working area).

The storage section 102 is a storage device such as an HDD (Hard Disk Drive) or an SSD (Solid State Drive). The storage section 102 stores a control program 110 and connection permission list information 111.

The control program 110 is an operating system and a program for performing the functions of the appliance 10. The control program 110 includes a program for performing functions relating to the present embodiment.

The connection permission list information 111 is a list of targets that are permitted to be connected to the appliance 10. More specifically, the connection permission list information 111 includes one or more pieces of access right information 308 (refer to FIG. 4). The access right information 308 is identification information capable of identifying a target that is permitted to be connected with the appliance 10. For example, the access right information 308 may be information for identifying the portable terminal 30, such as a MAC (Media Access Control) address or an SSID (Service Set IDentifier), or information for identifying a maintenance person who operates the portable terminal 30, such as a user code or a password, or may be a combination of the both.

The communication interface 103 is used for communicating with other devices connected to the network 40.

The near field wireless communication interface 104 is used for performing the near field wireless communication, such as Bluetooth® Technology according to IEEE 802.15.1 protocol standard or Wi-Fi (Wireless Fidelity) according to IEEE 802.11 protocol standards.

The printing section 105 is a print head or the like, and prints various kinds of information on a print medium.

The conveyance section 106 includes a motor, a roller and the like to convey an ink ribbon or a print medium such as a sheet.

The sensor 107 detects abnormality occurring in the appliance 10. For example, the sensor 107 detects a remaining quantity of the sheet, a remaining quantity of the ink ribbon, a sheet jam, and the like.

The connection display section 108 displays a state of connection with the portable terminal 30 via the near field wireless communication. For example, the connection display section 108 is an LED (Light Emitting Diode). The connection display section 108 is turned on when the appliance 10 is connected with the portable terminal 30 via the near field wireless communication, and is turned off when the connection therebetween is cut off. The connection display section 108 is not limited to the LED, and may be a rotating lamp or a light bulb.

Figure 3:
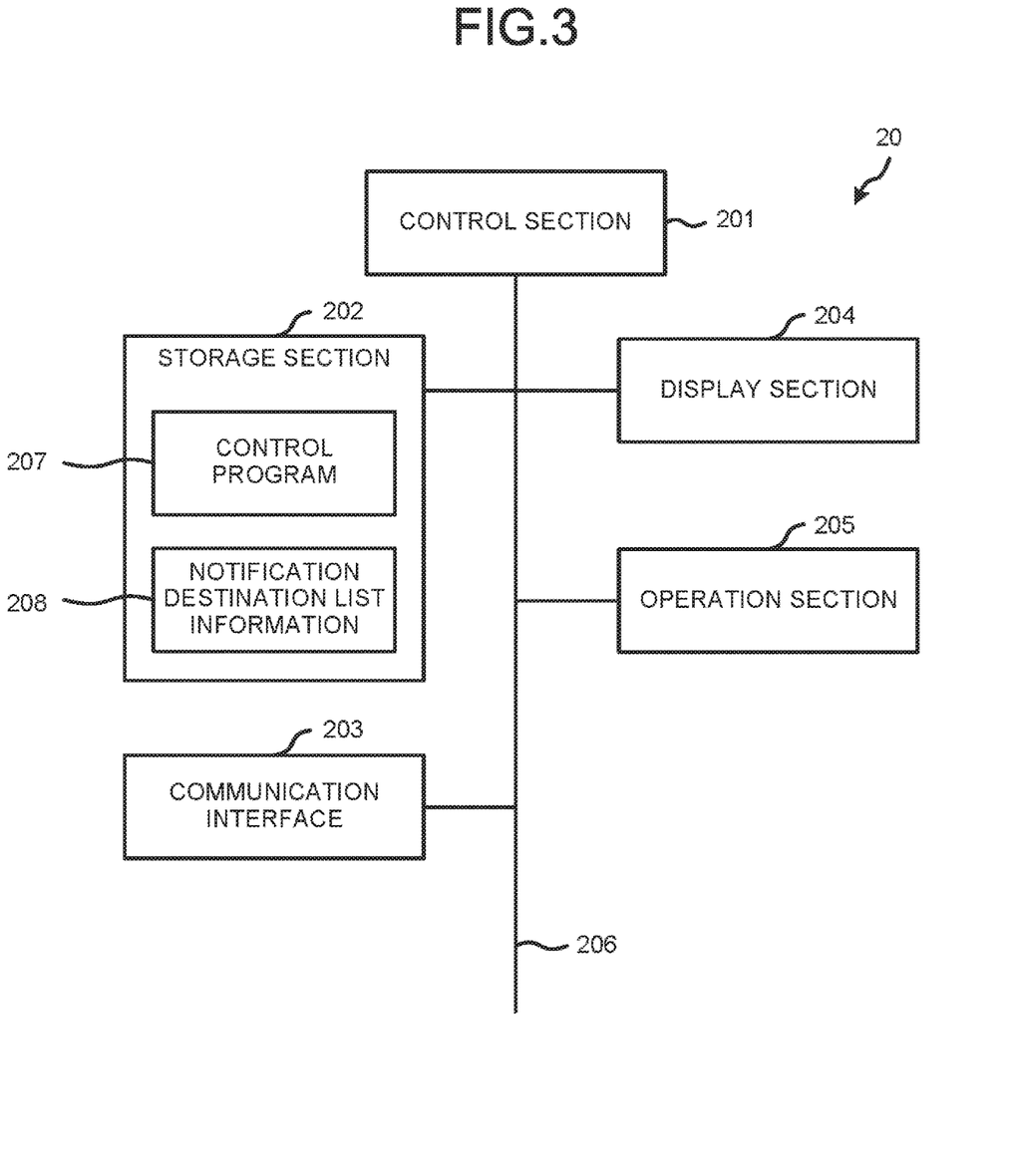
FIG. 3 is a block diagram illustrating an example of a hardware structure of a management apparatus.

FIG. 3 is a block diagram illustrating an example of a hardware structure of the management apparatus 20. The management apparatus 20 includes a control section 201, a storage section 202, a communication interface 203, a display section 204, and an operation section 205. These sections are mutually connected via a system bus 206 such as a data bus or an address bus.

The control section 201 is a computer that controls the entire operation of the management apparatus 20 to perform various functions of the management apparatus 20. The control section 201 includes a CPU, a ROM, and a RAM. The CPU is a processor that collectively controls the operation of the management apparatus 20. The ROM is a non-volatile storage medium that holds various kinds of data even when no electric power is supplied. The RAM is a storage medium capable of reading and writing data from and to a designated area. Then, the CPU executes a program stored in the ROM or the storage section 202 on the RAM as a work area (working area).

The storage section 202 is a storage device such as an HDD or an SSD. The storage section 202 stores a control program 207 and a notification destination list information 208.

The control program 207 is an operating system or a program for performing functions of the management apparatus 20. The control program 207 includes a program for performing functions relating to the present embodiment.

The notification destination list information 208 indicates a list of notification destinations to be notified when an abnormality occurs in the appliance 10. The notification destination list information 208 contains appliance code and notification destination information in an associated manner. The appliance code is identification information capable of identifying the appliance 10. The notification destination information indicates a notification destination to be notified that the abnormality occurs in the appliance 10. In other words, the notification destination information indicates the portable terminal 30 to be notified that the abnormality occurs. For example, the notification destination information is an e-mail address or the like. The notification destination list information 208 may contain an abnormality code and the notification destination information in an associated manner in addition to the appliance code. Specifically, in the notification destination list information 208, the appliance 10 and the notification destination may be contained in an associated manner; contents of the abnormality and the notification destination may be contained in an associated manner; the appliance 10, the contents of the abnormality and the notification destination may be contained in an associated manner; or other information and the notification destination may be contained in an associated manner.

The communication interface 203 is used for communicating with other devices connected to the network 40.

The display section 204 is, for example, a liquid crystal display. The operation section 205 is an input device such as a keyboard and a mouse. The management apparatus 20 may not include the display section 204 and the operation section 205 in a case in which it is a program logic controller.

Figure 4:
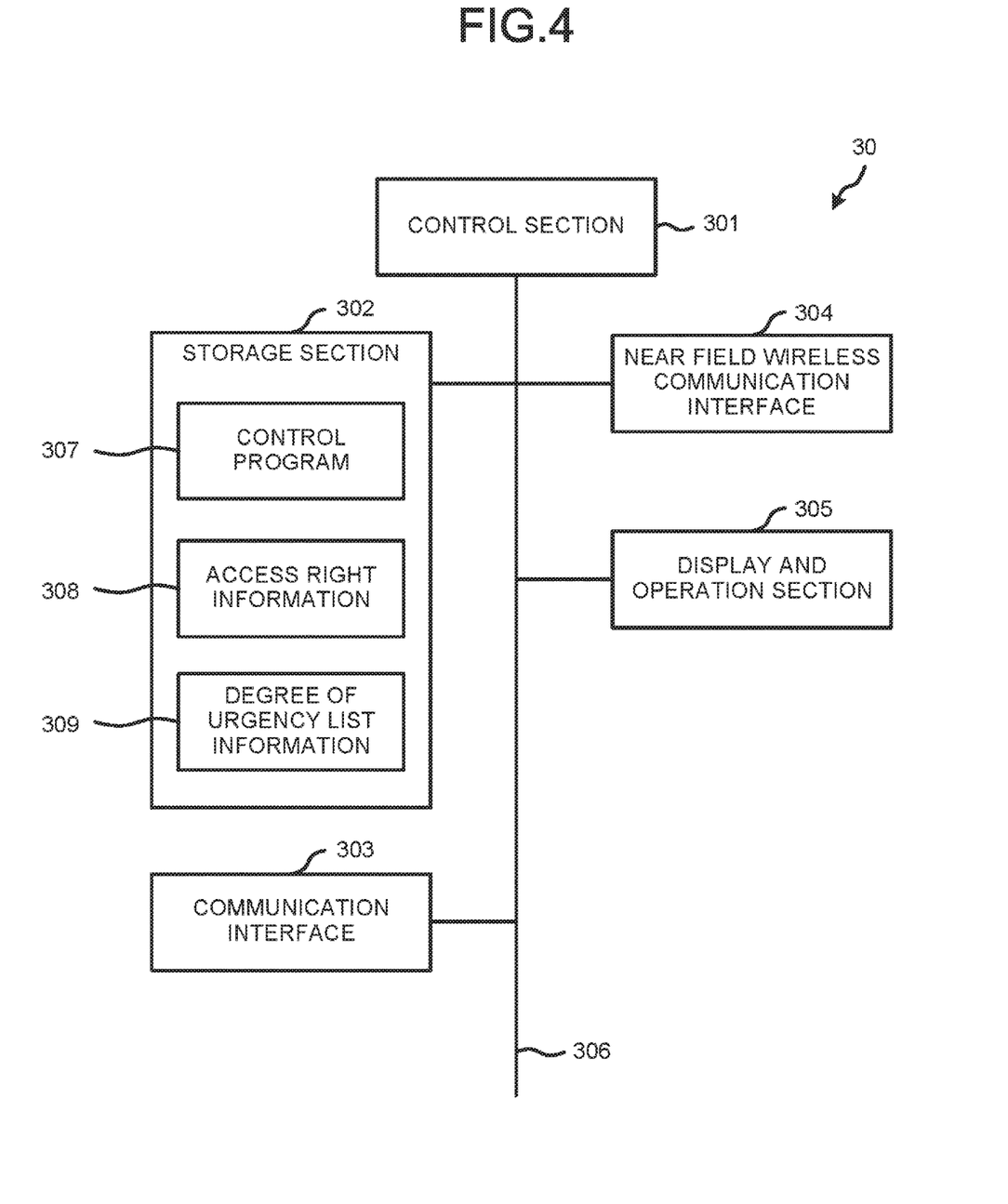
FIG. 4 is a block diagram illustrating an example of a hardware structure of a portable terminal.

FIG. 4 is a block diagram illustrating an example of a hardware structure of the portable terminal 30. The portable terminal 30 comprises a control section 301, a storage section 302, a communication interface 303, a near field wireless communication interface 304, and a display and operation section 305. These sections are mutually connected via a system bus 306 such as a data bus or an address bus.

The control section 301 is a computer that controls the entire operation of the portable terminal 30 to perform various functions of the portable terminal 30. The control section 301 includes a CPU, a ROM, and a RAM. The CPU is a processor that collectively controls the operation of the portable terminal 30. The ROM is a non-volatile storage medium that holds various kinds of data even when no electric power is supplied. The RAM is a storage medium capable of reading and writing data from and to a designated area. Then, the CPU executes a program stored in the ROM or the storage section 302 on the RAM as a work area (working area).

The storage section 302 is a storage device such as a flash memory. The storage section 302 stores a control program 307, access right information 308, and degree of urgency list information 309.

The control program 307 is an operating system or a program for performing the functions of the portable terminal 30. The control program 307 includes a program for performing functions relating to the present embodiment. Specifically, the control program 307 includes application software for controlling display of various kinds of information relating to the appliance 10.

The access right information 308 is identification information to be transmitted to request connection permission at the time of connection with the appliance 10 via the near field wireless communication.

The degree of urgency list information 309 indicates a degree of urgency for each abnormality occurring in the appliance 10. More specifically, in the degree of urgency list information 309, the abnormality code and the degree of urgency are contained in an associated manner. The abnormality code is identification information capable of identifying the detected abnormality. The degree of urgency indicates a degree of urgency of the maintenance against the detected abnormality. The degree of urgency may be indicated with a numeric value or words such as an error or a warning.

The communication interface 303 is used for communicating with other devices connected to the network 40.

The near field wireless communication interface 304 is used for performing the near field wireless communication, such as Bluetooth® Technology or Wi-Fi.

The display and operation section 305 is, for example, a touch panel display. The display and operation section 305 detects a portion operated (touched) on a display thereof, and determines that an operation corresponding to a display element displayed on the display is input. Thereby, the display and operation section 305 receives an operation on a button displayed on the display on the assumption that the button is operated. The display and operation section 305 is not limited to including the buttons displayed on the display, and may include buttons and the like formed by hardware.

Figure 5:
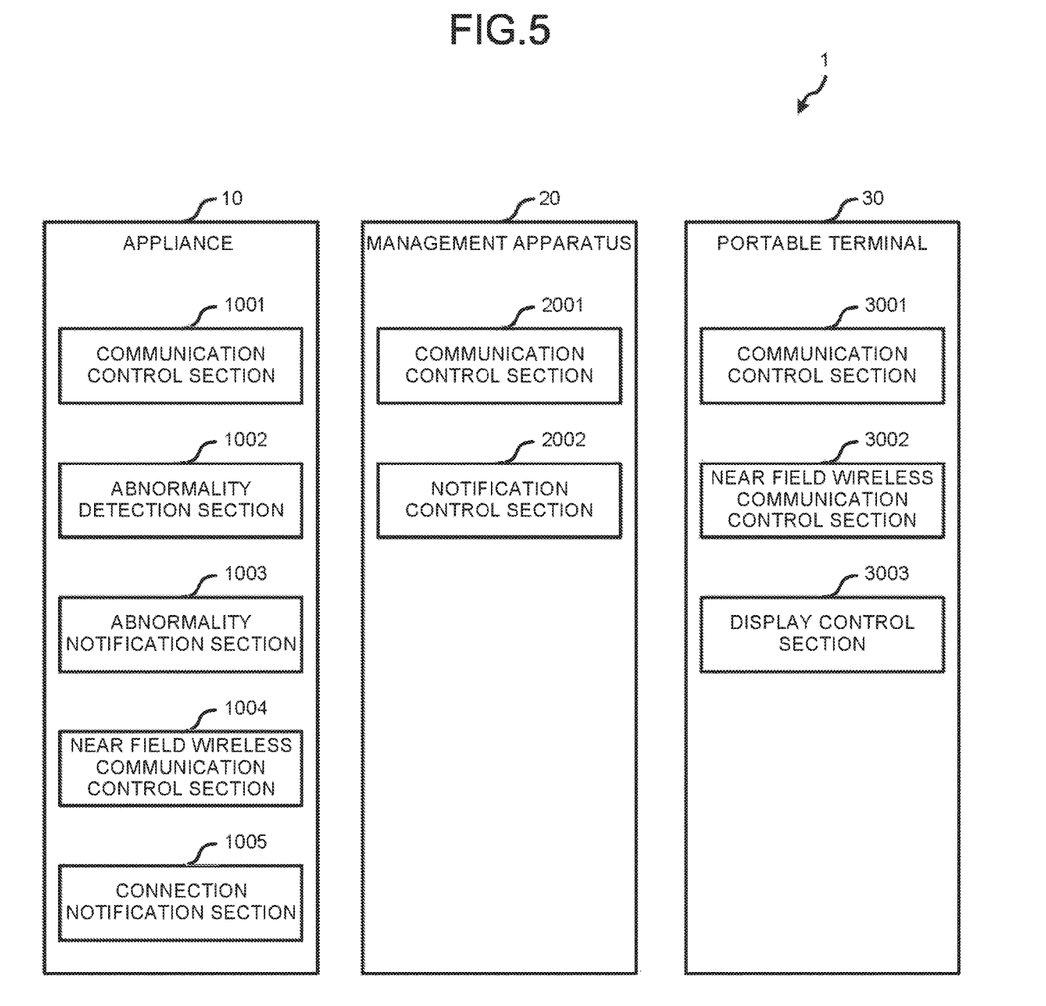
FIG. 5 is a block diagram illustrating an example of characteristic functional components of each device included in the appliance management system.

Next, characteristic functions of various devices of the appliance management system 1 are described. FIG. 5 is a block diagram illustrating an example of characteristic functional components of various devices of the appliance management system 1.

The control section 101 of the appliance 10 copies or decompresses the control program 110 in the storage section 102 on the RAM and operates according to the control program 110 to generate functional sections shown in FIG. 5 on the RAM. Specifically, the control section 101 of the appliance 10 includes, as functional sections, a communication control section 1001, an abnormality detection section 1002, an abnormality notification section 1003, a near field wireless communication control section 1004 and a connection notification section 1005.

The communication control section 1001 controls the communication interface 103 to execute communication with a device connected to the network 40. For example, the communication control section 1001 transmits the abnormality occurrence information. The abnormality occurrence information is used for notifying that an abnormality occurs in the appliance 10. The abnormality occurrence information includes an appliance code for identifying the appliance 10 and an abnormality code for identifying the abnormality occurring in the appliance 10.

The abnormality detection section 1002 is an example of a detection module. The abnormality detection section 1002 monitors the state of the appliance 10 to detect an abnormality occurring in the appliance 10. For example, the abnormality detection section 1002 detects that an abnormality occurs in the appliance 10 according to a signal output from the sensor 107. The abnormality detection section 1002 detects that an abnormality occurs in the appliance 10 from logs of the hardware provided in the appliance 10. For example, the abnormality refers to that the sheet or the ink has run out, that the remaining quantity of the sheet or the ink is less than a threshold value, or that sheet jam occurs. The type of abnormality detected by the abnormality detection section 1002 may be changed.

The abnormality notification section 1003 controls the communication control section 1001 to transmit the abnormality occurrence information when the abnormality is detected by the abnormality detection section 1002.

The near field wireless communication control section 1004 is an example of a transmission module. The near field wireless communication control section 1004 controls the near field wireless communication interface 104 to execute the near field wireless communication with the portable terminal 30. For example, the near field wireless communication control section 1004 transmits the appliance code for identifying the appliance 10 to an unspecified device by broadcast.

If the access right information 308 as a response to the broadcast is received, the near field wireless communication control section 1004 determines whether or not the portable terminal 30 transmitting the access right information 308 has the right to receive the abnormality information. Specifically, the near field wireless communication control section 1004 determines whether or not the received access right information 308 is included in the connection permission list information 111.

The near field wireless communication control section 1004 permits the near field wireless communication with the portable terminal 30 transmitting the access right information 308 when the received access right information 308 is included in the connection permission list information 111. The near field wireless communication control section 1004 establishes the connection with the portable terminal 30 via the near field wireless communication. The near field wireless communication control section 1004 transmits and receives various kinds of information to and from the portable terminal 30 connected via the near field wireless communication. For example, the near field wireless communication control section 1004 transmits the abnormality information indicating details of the abnormality occurring in the appliance 10 and detected by the abnormality detection section 1002 to the portable terminal 30 via the near field wireless communication. The abnormality information includes the abnormality code for identifying the abnormality occurring in the appliance 10.

On the other hand, the near field wireless communication control section 1004 prohibits the near field wireless communication with the portable terminal 30 that transmitted the access right information 308 when the received access right information 308 is not included in the connection permission list information 111. The near field wireless communication control section 1004 cuts off the connection with the portable terminal 30 via the near field wireless communication.

The connection notification section 1005 is an example of a notification module. The connection notification section 1005 notifies that the appliance 10 is being connected with the portable terminal 30 via the near field wireless communication. For example, the connection notification section 1005 turns on the connection display section 108 when the appliance 10 is being connected with the portable terminal 30 via the near field wireless communication. On the other hand, the connection notification section 1005 turns off the connection display section 108 when the appliance 10 is not connected with the portable terminal 30 via the near field wireless communication.

The control section 201 of the management apparatus 20 copies or decompresses the control program 207 in the storage section 202 on the RAM and operates according to the control program 207 to generate functional sections shown in FIG. 5 on the RAM. Specifically, the control section 201 of the management apparatus 20 includes a communication control section 2001 and a notification control section 2002 as functional sections.

The communication control section 2001 controls the communication interface 203 to establish communication with a device connected to the network 40. For example, the communication control section 2001 receives the abnormality occurrence information from the appliance 10.

The notification control section 2002 extracts the appliance code and the abnormality code if the communication control section 2001 receives the abnormality occurrence information. The notification control section 2002 extracts the notification destination information associated with the extracted appliance code or abnormality code. Then, the notification control section 2002 transmits the abnormality occurrence information indicating that the abnormality occurs in the appliance 10 to the notification destination identified by the notification destination information. The abnormality occurrence information includes the appliance code for identifying the appliance 10 in which the abnormality occurs.

The control section 301 of the portable terminal 30 copies or decompresses the control program 307 in the storage section 302 on the RAM and operates according to the control program 307 to generate functional sections shown in FIG. 5 on the RAM. Specifically, the control section 301 of the portable terminal 30 includes a communication control section 3001, a near field wireless communication control section 3002 and a display control section 3003 as functional sections.

The communication control section 3001 controls the communication interface 303 to establish communication with a device connected to the network 40. For example, the communication control section 3001 receives the abnormality occurrence information from the management apparatus 20.

The near field wireless communication control section 3002 controls the near field wireless communication interface 304 to establish the near field wireless communication with the appliance 10. For example, the near field wireless communication control section 3002 receives the appliance code transmitted through broadcast from the appliance 10 in a communication area in which the near field wireless communication is enabled. The near field wireless communication control section 3002 transmits the access right information 308 as the response to the broadcast.

The near field wireless communication control section 3002 establishes a connection with the appliance 10 via the near field wireless communication when the near field wireless communication with the appliance 10 is permitted. The near field wireless communication control section 3002 transmits and receives various kinds of information to and from the appliance 10 connected via the near field wireless communication. For example, the near field wireless communication control section 3002 receives the abnormality information indicating contents of the abnormality occurring in the appliance 10 from the appliance 10 via the near field wireless communication. On the other hand, when the near field wireless communication with the appliance 10 is prohibited, the near field wireless communication control section 3002 cuts off the connection with the appliance 10 via the near field wireless communication.

The display control section 3003 controls the display and operation section 305 to display various kinds of information.

For example, the display control section 3003 controls the display and operation section 305 to display the abnormality occurrence information when the communication control section 3001 receives the abnormality occurrence information. Specifically, the display control section 3003 performs control to display that the abnormality occurs in the appliance 10 identified by the appliance code included in the abnormality occurrence information.

The display control section 3003 performs control to display an appliance abnormality screen (not shown) when the communication control section 3001 receives the abnormality information. The appliance abnormality screen shows various kinds of information relating to the appliance 10 being connected via the near field wireless communication. Specifically, the appliance abnormality screen shows details of the abnormality occurring in the appliance 10 identified by the received abnormality information and the appliance code for identifying the appliance 10 connected via the near field wireless communication.

More specifically, the display control section 3003 determines whether or not application software for controlling display of various kinds of information relating to the appliance 10 is started when the communication control section 3001 receives the abnormality information. The display control section 3003 performs control to display the appliance abnormality screen when application software is started.

On the other hand, when the application software is not started, the display control section 3003 extracts the degree of urgency of the abnormality code included in the abnormality information from the degree of urgency list information 309. Then, the display control section 3003 determines whether or not the degree of urgency extracted from the degree of urgency list information 309 is equal to or larger than a setting value. Here, the setting value indicates a threshold value for determining whether to display the appliance abnormality screen. The setting value may be a changeable value.

If the degree of urgency is less than the setting value, the display control section 3003 does not perform control to display the appliance abnormality screen when the application software is not started. On the other hand, when the degree of urgency is equal to or larger than the setting value, the display control section 3003 performs control to display the appliance abnormality screen even if the application software is not started.

Figure 6:
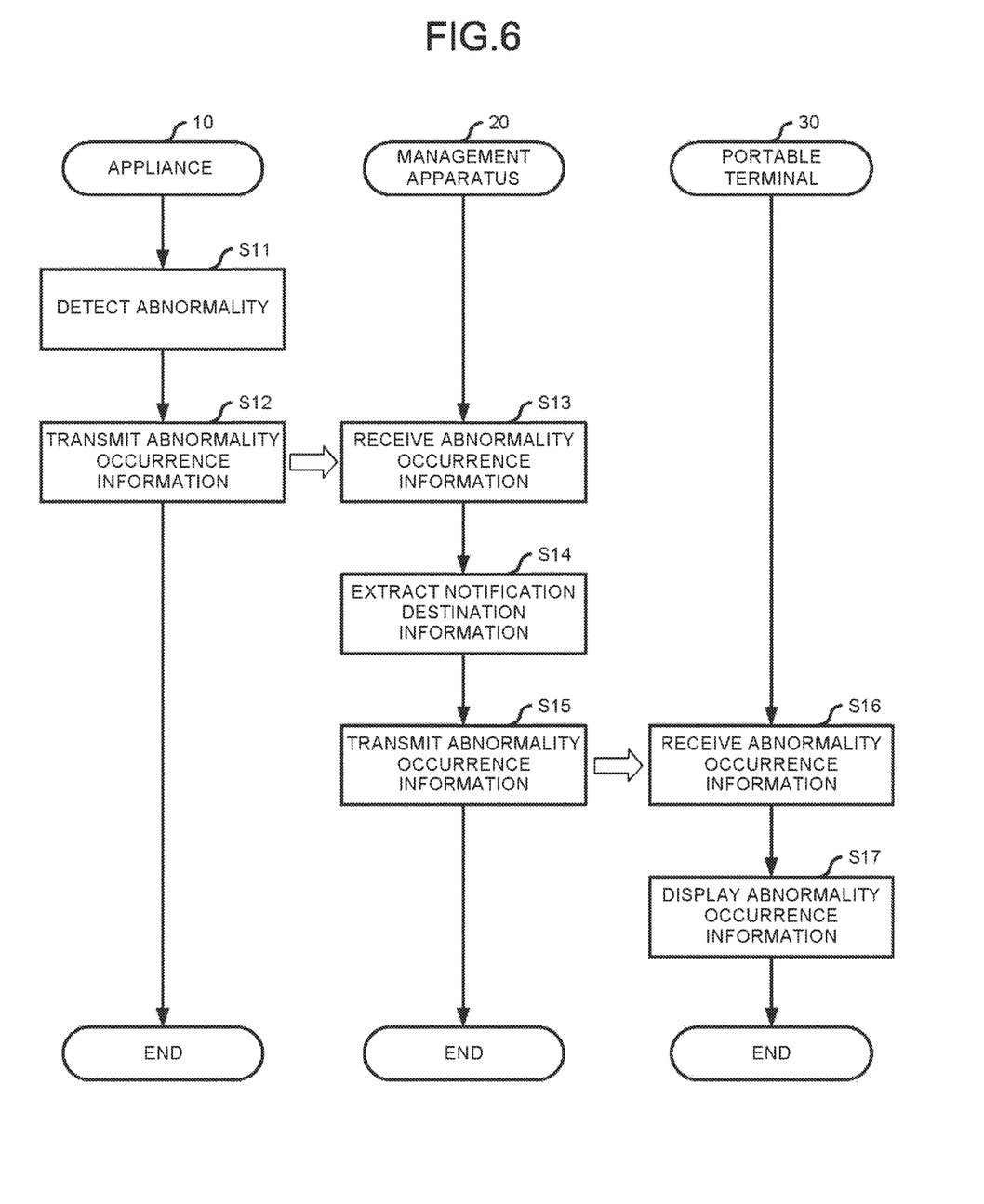
FIG. 6 is a sequence diagram illustrating an example of notification processing performed by each device included in the appliance management system according to the present embodiment.

Next, notification processing executed by respective devices included in the appliance management system 1 is described. The notification processing is processing of notifying that an abnormality occurs in the appliance 10. FIG. 6 is a sequence diagram illustrating an example of the notification processing performed by respective devices included in the appliance management system 1 according to the present embodiment.

The abnormality detection section 1002 of the appliance 10 detects an abnormality (Act S11). The abnormality notification section 1003 controls the communication control section 1001 to transmit the abnormality occurrence information indicating that the abnormality is detected by the abnormality detection section 1002 (Act S12).

The communication control section 2001 of the management apparatus 20 receives the abnormality occurrence information (Act S13). The notification control section 2002 extracts the notification destination information associated with the appliance code included in the received abnormality occurrence information from the notification destination list information 208 (Act S14). The communication control section 2001 transmits the abnormality occurrence information to the portable terminal 30 identified by the notification destination information extracted from the notification destination list information 208 (Act S15).

The communication control section 3001 of the portable terminal 30 receives the abnormality occurrence information (Act S16). The display control section 3003 displays the abnormality occurrence information (Act S17).

Thus, the respective devices included in the appliance management system 1 terminate the notification processing. Through such notification processing, a maintenance person can recognize that the abnormality occurs in the appliance 10. Therefore, the maintenance person can start moving to the appliance 10 in which the abnormality occurs.

Figure 7:
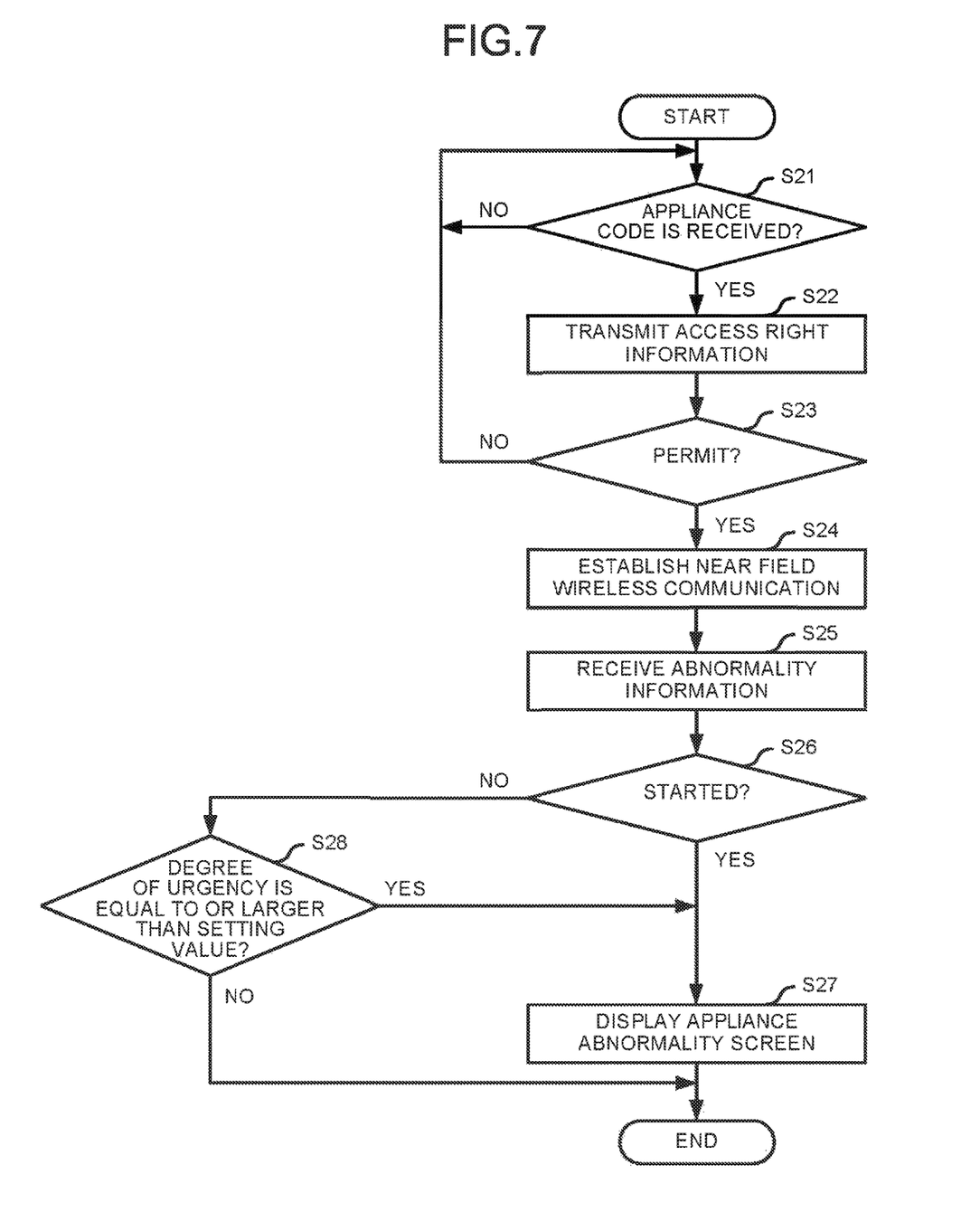
FIG. 7 is a flowchart depicting an example of display processing performed by the portable terminal.

Next, display processing performed by the portable terminal 30 is described. The display processing is a processing for enabling the portable terminal 30 to display the appliance abnormality screen. FIG. 7 is a flowchart depicting an example of the display processing performed by the portable terminal 30.

The near field wireless communication control section 3002 determines whether or not the appliance code transmitted through the broadcast by the appliance 10 is received (Act S21). If the appliance code is not received (No in Act S21), the portable terminal 30 stands by in Act S21 until the appliance code is received.

On the other hand, if the appliance code is received (Yes in Act S21), the near field wireless communication control section 3002 transmits the access right information 308 via the near field wireless communication (Act S22).

The near field wireless communication control section 3002 determines whether or not the near field wireless communication with the appliance 10 transmitting the appliance code is permitted (Act S23). If the near field wireless communication with the appliance 10 is prohibited (No in Act S23), the process of the portable terminal 30 returns to Act S21.

The near field wireless communication control section 3002 establishes the near field wireless communication with the appliance 10 (Act S24) if the near field wireless communication with the appliance 10 is permitted (Yes in Act S23).

The near field wireless communication control section 3002 receives the abnormality information for identifying the abnormality occurring in the appliance 10 from the appliance 10 (Act S25).

The display control section 3003 determines whether or not the application software for displaying the abnormality occurring in the appliance 10 is started (Act S26).

If the application software is started (Yes in Act S26), the display control section 3003 performs control to display the appliance abnormality screen (Act S27). Specifically, the display control section 3003 performs control to display the appliance code and the abnormality occurring in the appliance 10 connected via the near field wireless communication.

If the application software is not started (No in Act S26), the display control section 3003 determines whether or not the degree of urgency of the abnormality code included in the received abnormality information is equal to or larger than the setting value (Act S28). In other words, the display control section 3003 compares the abnormality code included in the received abnormality information with the degree of urgency list information 309 to determine whether or not the degree of urgency is equal to or larger than the setting value.

If the degree of urgency is equal to or larger than the setting value (Yes in Act S28), the display control section 3003 proceeds to the processing in Act S27 to perform control to display the appliance abnormality screen. On the other hand, if the degree of urgency is less than the setting value (No in Act S28), the display control section 3003 does not perform control to display the appliance abnormality screen.

Thus, the portable terminal 30 terminates the display processing. Through such display processing, the maintenance person can recognize the details of the abnormality occurring in the appliance 10.

As described above, the appliance management system 1 according to the present embodiment includes the appliance 10 and the portable terminal 30. The portable terminal 30 displays the abnormality occurring in the appliance 10 connected via the near field wireless communication. The portable terminal 30 also displays the identification information capable of identifying the appliance 10 connected via the near field wireless communication. Thus, the appliance management system 1 can notify the connected appliance 10.

In the present embodiment, the near field wireless communication section 3002 of the portable terminal 30 receives the abnormality information from the appliance 10; however, it is not limited thereto. For example, the communication control section 2001 of the management apparatus 20 may transmit the abnormality occurrence information at the time of transmitting the abnormality occurrence information to the portable terminal 30. In this way, the maintenance person can confirm the information from the portable terminal and determine whether to perform maintenance of the appliance 10.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

The programs executed by each device of the foregoing embodiments and modifications may be incorporated into a non-transitory storage medium (e.g., ROM or other storage section) of each device; however, the present disclosure is not limited thereto. The programs may be recorded in a computer-readable recording medium such as a CD-ROM (compact disc read-only memory), an FD (Flexible Disk), a CD-R (Compact Disk Recordable), a DVD (Digital Versatile Disk), or the like as an installable or executable file.

Further, the programs executed by each device of the foregoing embodiment and the modification may be provided by being stored in a computer connected with a network such as the Internet and downloaded via the network or may be supplied or distributed via the network such as the Internet.

What is claimed is:

1. An appliance management system, comprising:
   a plurality of appliances connected to a network; and
   a portable terminal connectable to the plurality of appliances, wherein each of the appliances comprises:
   a sensor configured to detect an abnormality of the appliance; and
   a first near field wireless communication module configured to broadcast an identifier of the appliance when the sensor detects the abnormality, no abnormality code of the abnormality being broadcasted with the identifier of the appliance, the portable terminal comprises:
   a second near field wireless communication module; and
   a terminal controller configured to:
   control the second near field wireless communication module to transmit an access request including an identifier of the portable terminal to an abnormal appliance in the plurality of appliances upon the second near field wireless communication module receiving an identifier of the abnormal appliance within a near field wireless communication range,
   establish a one-to-one near field wireless communication with the abnormal appliance upon the access request being granted by the abnormal appliance, and
   control a display to display an abnormality screen including the identifier of the abnormal appliance upon the second near field wireless communication module receiving abnormality information including the abnormality code of the abnormality transmitted from the abnormal appliance via the one-to-one near field wireless communication.

2. The appliance management system according to claim 1, wherein each of the appliances further comprises:
   an appliance controller configured to indicate a connection state when the one-to-one near field wireless communication is established between the first near field wireless communication module of the appliance and the second near field wireless communication module of the portable terminal.

3. The appliance management system according to claim 1, wherein
   each of the appliances further comprises an appliance controller configured to:
   determine whether or not to grant the access request based on the identifier of the portable terminal, when the appliance receives the access request from the portable terminal in response to the identifier of the appliance, and
   control the first near field wireless communication module of the appliance to transmit the abnormality information when the one-to-one near field wireless communication is established.

4. The appliance management system according to claim 1, wherein the terminal controller is further configured to:
   determine whether or not an abnormality management application software is running in the portable terminal, and
   control the display to display the abnormality screen upon determining that the abnormality management application software is running in the portable terminal.

5. The appliance management system according to claim 4, wherein
   the terminal controller is further configured to:
   determine whether or not the abnormality code in the abnormality information satisfies a predetermined condition upon determining that the abnormality management application software is not running in the portable terminal, and
   control the display to display the abnormality screen upon determining that the abnormality code satisfies the predetermined condition.

6. The appliance management system according to claim 1, wherein the first near field wireless communication module and the second near field wireless communication module are communicable according to IEEE 802.15.1 protocol standard.

7. The appliance management system according to claim 1, wherein the first near field wireless communication module and the second near field wireless communication module are communicable according to IEEE 802.11 protocol standards.

8. The appliance management system according to claim 1, wherein at least one of the appliances is a printer.

9. The appliance management system according to claim 1, wherein at least one of the appliances is a labeling apparatus.

10. The appliance management system according to claim 1, wherein at least one of the appliances is a packing apparatus.

11. A method for managing a plurality of appliances connected to a network, comprising:
    in one of the appliances,
    detecting an abnormality of the appliance with a sensor; and
    broadcasting an identifier of the one of the appliances through a first near field wireless communication module when the sensor detects the abnormality, no abnormality code of the abnormality being broadcasted with the identifier;
    in a portable terminal connectable to the plurality of appliances,
    receiving the identifier of the one of the appliances with a second wireless communication module of the portable terminal when the portable terminal is within a near field wireless communication range of the one of the appliances;
    upon receiving the identifier of the one of the appliances, transmitting an access request including an identifier of the portable terminal from the second wireless communication module to the one of the appliances;
    establishing a one-to-one near field wireless communication with the one of the appliances upon the access request being granted by the one of the appliances;
    receiving abnormality information including the abnormality code of the abnormality from the one of the appliances transmitted via the one-to-one near field wireless communication, with the second wireless communication module; and upon receiving the abnormality information, displaying an abnormality screen including the identifier of the abnormal appliance.

12. The method according to claim 11, further comprising:
in the one of the appliances, indicating a connection state when the one-to-one near field wireless communication is established between the first near field wireless communication module thereof and the second near field wireless communication module of the portable terminal.

13. The method according to claim 11,
further comprises:
in the one of the appliances, upon receiving the access request from the portable terminal in response to the identifier of the one of the appliances, determining whether or not to grant the access request based on the identifier of the portable terminal, wherein the abnormality information is transmitted when the one-to-one near field wireless communication is established.

14. The method according to claim 11, further comprising, in the portable terminal:
determining whether or not abnormality management application software is running in the portable terminal, wherein the abnormality screen is displayed in a case of determining that the abnormality management application software is running in the portable terminal.

15. The method according to claim 11,
further comprising, in the portable terminal:
upon determining that the abnormality management application software is not running in the portable terminal, determining whether or not the abnormality code satisfies a predetermined condition, wherein the abnormality screen is displayed in a case of determining that the abnormality code satisfies the predetermined condition.

16. The method according to claim 11, wherein the first near field wireless communication module and the second near field wireless communication module are communicable according to IEEE 802.15.1 protocol standard.

17. The method according to claim 11, wherein the first near field wireless communication module and the second near field wireless communication module are communicable according to IEEE 802.11 protocol standards.

18. The method according to claim 11, wherein the one of the appliances is a printer.

19. The method according to claim 11, wherein the one of the appliances is a labeling apparatus.

20. The method according to claim 11, wherein the one of the appliances is a packing apparatus.

\* \* \* \* \*